United States Patent [19] [11] 4,419,108
Frost et al. [45] Dec. 6, 1983

[54] FILTER APPARATUS AND METHOD OF FILTERING

[75] Inventors: Rodney I. Frost, Corning; Max R. Montierth, Elmira, both of N.Y.

[73] Assignee: Corning Glass Works, Corning, N.Y.

[21] Appl. No.: 351,126

[22] Filed: Feb. 22, 1982

[51] Int. Cl.³ .................................................. B01D 39/20
[52] U.S. Cl. .......................................... 55/97; 55/502; 55/523; 55/DIG. 30; 60/311; 210/510; 422/180
[58] Field of Search .................... 55/97, 330, 484, 502, 55/505, 507, 523, DIG. 5, DIG. 30; 210/434, 510; 60/295, 299, 311; 422/179, 180, 171; 428/116–118; 501/112, 119, 80; 252/477 R; 165/8; 29/163.5 F

[56] References Cited

U.S. PATENT DOCUMENTS

| | | | |
|---|---|---|---|
| 3,597,165 | 8/1971 | Keith et al. | 55/523 |
| 3,963,445 | 6/1976 | Koyama et al. | 422/179 |
| 4,133,657 | 1/1979 | Krogsrud | 55/523 |
| 4,276,071 | 6/1981 | Outland | 55/523 |
| 4,328,187 | 5/1982 | Mosall et al. | 422/179 |
| 4,329,162 | 5/1982 | Pitcher, Jr. | 55/523 |
| 4,363,644 | 12/1982 | Sato et al. | 55/523 |

FOREIGN PATENT DOCUMENTS

380821 6/1940 Italy ...................................... 55/484
2071639 9/1981 United Kingdom ................ 428/116
2071640 9/1981 United Kingdom ................ 428/116

Primary Examiner—David L. Lacey
Attorney, Agent, or Firm—R. N. Wardell

[57] ABSTRACT

Filtering capacity of a honeycomb filter having a plurality of cells formed by a matrix of thin, porous intersecting walls and used for removing solid particulates mixed in fluids is improved by providing a porous outer wall around the thin walls through which the fluid is also filtered. A particulate barrier is provided between the outer wall and a conduit carrying the contaminated fluid to and filtered fluid from the filter which allows the fluid to flow along and through a substantial portion of the porous outer surface of the filter while preventing contaminated fluid from bypassing the filter. The barrier is preferably formed near an inlet or an outlet end face of the filter and those cells which are located around the periphery of the end faces are preferably open at that same end face and closed at the remaining end face to assure fluid flow across the porous outer wall. A method of filtering solid particulates from a fluid comprises providing the filter, conducting a fluid contaminated with solid particulates into the filter, filtering the particulates from the fluid by means of the thin walls and also through a substantial portion of the outer wall, and conducting filtered fluid away.

13 Claims, 9 Drawing Figures

FILTER APPARATUS AND METHOD OF FILTERING

BACKGROUND OF THE INVENTION

The invention relates to apparatus for filtering solid particulate matter from fluids and, in particular, to improved filters formed from thin, porous walled honeycomb structures and means for mounting the filters for advantageous operation.

The removal of solid particulate matter from fluids (gases or liquids) in which they are mixed is typically accomplished by means of filters made from solid materials formed into articles or masses and having a plurality of pores extending through them (which may be interconnected) of a small cross-sectional size such that the solid materials are both permeable to the fluids and capable of restraining most or all of the solid particulate matter carried by the fluid from passing through the article or mass. Such pores constitute what is termed "open porosity" or "accessible porosity." The minimum cross-sectional size of some or all of the pores can be larger than the size of some or all of the particulates to be filtered, but only to the extent that all or significant desired amounts of sufficiently large particulates become trapped on the inlet surfaces and/or within the pores during the transit of the fluid through the article or mass.

A pending application Ser. No. 165,646, filed July 3, 1980, assigned to the assignee of this application, describes honeycomb filters preferably formed from extruded and sintered ceramic materials which may be used for removing carbonaceous particulates from diesel engine exhaust gases and for other high temperature fluid filtering applications. The filters are of honeycomb structure each comprising a matrix of thin, porous interconnected walls which define inlet and outlet end faces on opposing outer surfaces of the filter and a plurality of hollow passages or cells which extend through the filter body between the inlet and outlet end faces. The thin, porous cell walls may form the outer surface of the filter body between the end faces but more typically, a somewhat thicker, smooth continuous surface or skin is provided surrounding the cells for strength, uniform outer dimensioning, etc.. One end of each of the cells is blocked to form inlet and outlet cells, the inlet group of cells being blocked near the outlet end face and the inlet group of cells being blocked near the outlet end face. The opposing end of each of the cells remains open at the opposing end face. The inlet and outlet cells are alternated so as to adjoin one another and share in common the thin porous walls which define each of the cells. A contaminated fluid introduced under pressure to the inlet end face passes into the filter body through the inlet cells and is forced through the thin, porous walls, which trap the solid particulates present in the fluid, and into adjoining outlet cells through which the now cleansed fluid exits the filter body. Particulates are deposited on the thin wall surfaces of the inlet cells or are trapped in the pores within these walls. Various improvements to the described filter bodies, including filtration through the larger dimensions of the thin porous walls shared by adjoining inlet cells and the provision of asymmetric inlet and outlet cell thin wall surface areas are described and claimed in other copending application Ser. Nos. 350,998, 350,995, and 350,994 all filed on Feb. 22, 1982, which are assigned to the assignee hereof and incorporated by reference.

The described honeycomb filters are typically positioned for use in a housing or can which is installed across or as a component of conduits transporting contaminated fluid to and filtered fluid from the filter. A seal is formed along the outer longitudinal surface of the filter and an inner surface of the surrounding conduit structure to channel contaminated fluid to the inlet face and filtered fluid from the outlet face and to prevent the contaminated fluid from bypassing the filter body. Means used to form the seal may also support and fix the position of the filter with respect to the conduit. Typically, means are provided at either end of the filter body or along the longitudinal outer surface extending between its inlet and outlet end faces both to hold the body in position within the supporting conduit structure and to provide the aforesaid seal. For example, a seal may be formed about the diesel engine exhaust gas filter in the manner described in the aforementioned application Ser. No. 165,646 by providing flange-like mounting members or other comparable mounting members protruding from the inner surfaces of the surrounding conduit structure which are compressed against the outer edges of the filter's opposing inlet and outlet end faces. Seals are sometimes also formed by packing a suitably impermeable material into a gap formed between the longitudinal outer surface of the filter and the support structure, either at the ends of the filter, or along a substantial portion of the outer longitudinal surface of the filter, between the filter and the conduit structure so as to provide both the required support and a seal in a single manufacturing step. In each case, the seal thus formed prevents the flow of the fluid along any appreciable length of the outer surface of the filter extending between its inlet and outlet faces. An additional problem is created by the first described sealing method in that pressing flanges, O-rings or the like against the end faces tends to cover and block the cells located at the periphery of the end faces reducing the effective volume of the filter body and, in a filter used with a hot fluid, to create radially oriented thermal gradients giving rise to possibly detrimental thermal stresses within the filter.

OBJECTS AND SUMMARY OF THE INVENTION

It is an object of the invention to maximize the filtering surface area of a solid particulate filter of honeycomb structure by using all or substantially all of its longitudinally extending outer surface as a filtration surface.

It is another object of the invention to optimize the operation of a filter of honeycomb structure by providing means which prevents particulates in the fluid from flowing past the filter but which does not block any appreciable number of cells of the filter near the periphery of its end faces.

It is yet another object of the invention to minimize the creation of axially oriented thermal gradients in a solid particulate filter of honeycomb construction which is used to filter hot fluids.

According to the invention, these and other objects are accomplished by providing a solid particulate filter of honeycomb structure having a matrix of thin, porous intersecting thin walls defining an inlet end face and an outlet end face of the filter and a multiplicity of hollow passages or cells extending longitudinally through the filter between the two end faces, and a porous outer wall extending between the two end faces and around the matrix of thin walls forming a longitudinal outer surface of the filter. The thin walls and outer wall each contain interconnected internal open porosity of a volume and size sufficient to enable the fluid to flow completely across the thin walls and outer wall while restraining at least a significant portion of the particulates from flowing completely across the thin walls or outer wall. The multiplicity of cells are divided into an inlet group each cell of which is closed near the outlet end face and open at the inlet end face and an outlet group each cell of which is closed near the inlet end face and open at the outlet end face. The filter is positioned within conduit means which channel contaminated fluid to and filtered fluid away from the filter. Sealing means, preferably a particulate barrier, is provided between the longitudinally extending outer wall of the filter and an inner surface of the conduit means encircling the filter. This barrier prevents particulates in the contaminated fluid from flowing unrestrictedly past the filter and mixing with the filtered fluid being carried away from the filter by the conduit means.

According to one important aspect of the invention, the barrier is sufficiently narrow where it contacts the filter to allow fluid to flow along and through a substantial portion of the exterior surface of the outer wall.

According to one important aspect of the invention, the barrier contacts the filter along its outer longitudinal surface in the vicinity of one of its two end faces to maximize outer wall filtration surface area.

According to another important feature of the invention, all or substantially all of the cells around the periphery of the end faces are blocked at their ends opposite the one end face where the sealing means are located. This arrangement maximizes fluid flow through the outer surface and the peripherally located cells and minimizing the generation of radially oriented thermal gradience within the filter where a hot fluid is being filtered.

According to another important aspect of the invention, the barrier is essentially impervious to the fluid thereby maintaining a pressure drop across the filter fostering fluid flow therethrough.

According to yet another important feature of the invention, means may also be provided between the conduit means and the filter for restricting the movement of the filter in relation to the conduit means. These additional means do not impede the flow of fluid along the outer longitudinal surface of the filter.

According to yet another feature of the invention, the particulate barrier may also be fabricated so as to restrict or minimize the movement of the filter with respect to the conduit means.

A preferred use of the filter is to remove particulates from diesel engine exhaust gases. In such an application, the filter is located within an exhaust gas conduit interposed across the exhaust gas path leading from the engine.

The invention also includes the improved method of filtering particulates from a fluid passed through a honeycomb filter by additionally filtering the fluid through a substantial portion of the outer wall of the filter body.

BRIEF DESCRIPTION OF THE DRAWINGS

The various above identified and other aspects of the invention will be better understood by reference to the accompanying drawings in which.

DETAILED DESCRIPTION OF THE INVENTION

Figure 1:
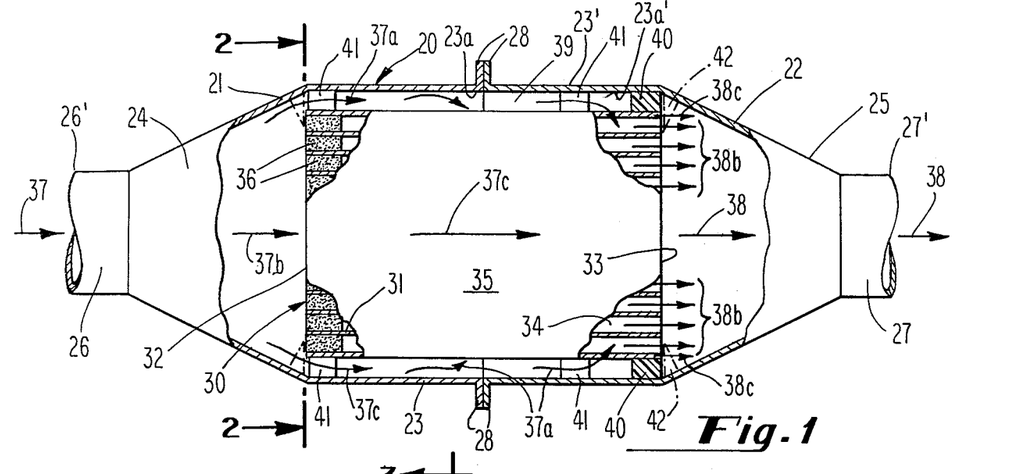
FIG. 1 is a longitudinal view of a conduit partially broken away to reveal a contained filter with its longitudinally extending outer wall partially broken away to reveal cells along the peripheral edge of the filter.
Figures 2, 3:
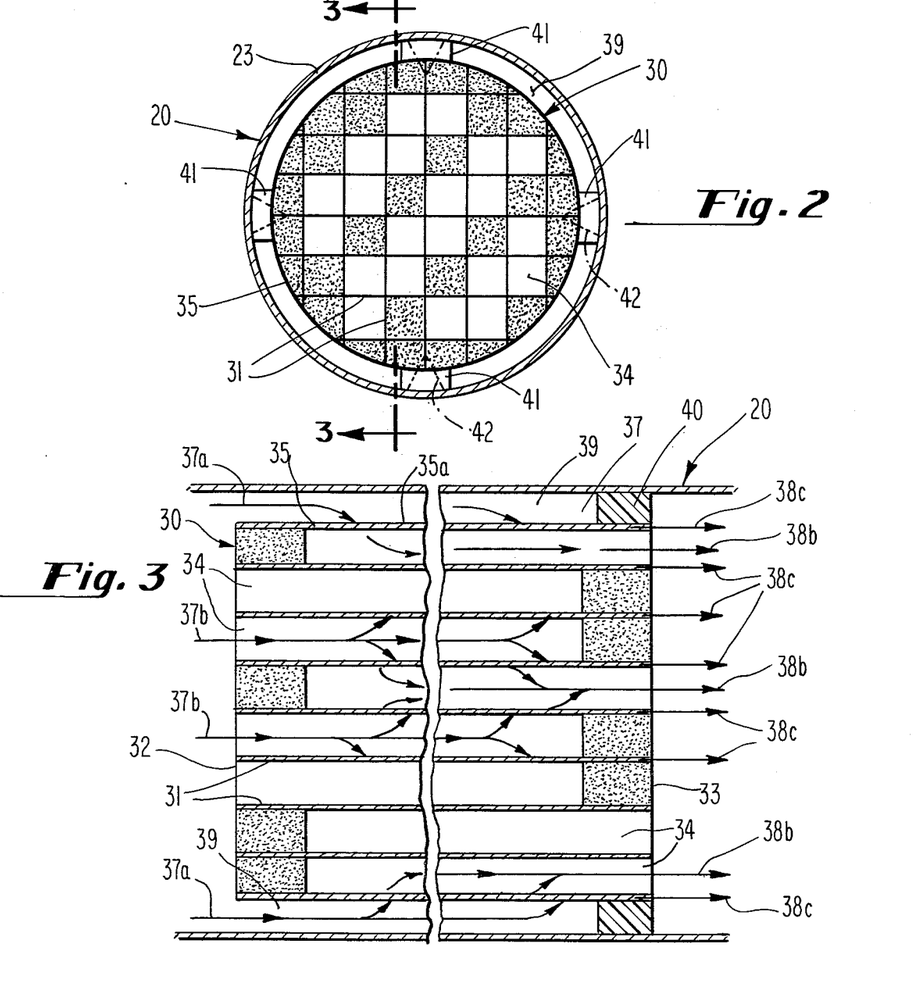
FIG. 2 is a cross-sectional view of the apparatus of FIG. 1 along the lines 2—2 depicting the inlet end face of the filter body.
FIG. 3 is a longitudinally sectioned view of the filter body of FIGS. 1 and 2 along the lines 3—3 depicting fluid flow through the filter body and its outer wall.

FIGS. 1 through 3 depict a first exemplary preferred embodiment of the invention comprising housing or can 20, a filter 30 of honeycomb structure, and sealing means in the form of a particulate barrier 40 between the conduit 20 and filter 30. The can 20 may be of unitary construction but desirably is sectioned to allow easy access to the filter 30. The can 20 comprises two parts, 21 and 22, formed by substantially identical filter holding sections 23 and 23' and conical sections 24 and 25 respectively joining a fluid inlet connector 26 and a fluid outlet connector 27 to the filter holding portions 23 and 23' and mating flanges 28. The ends 26' and 27' of the fluid connectors 26 and 27 have been sectioned for compactness in FIG. 1 but would connect with upstream conduit carrying contaminated fluid to and downstream conduit carrying filtered fluid from the can 20. The flanges 28 may be mechanically fastened together (e.g. by bolts and nuts not shown) to keep the conduit means 20 properly assembled for use but to also allow it to be unfastened for replacement of the filter 30 or fixedly joined by welding rivets or the like for disposal of the can 20 and filter 30 after use. The filter 30 is of honeycomb structure having a matrix of thin porous intersecting walls 31 defining an upstream "inlet" end face 32 and a downstream "outlet" end face 33 and a plurality of hollow passages or cells 34 extending substantially lonitudinally through the filter 30 between the end faces 32 and 33. A porous outer wall or skin 35 extends longitudinally between the end faces 32 and 33 and around the matrix of thin walls 31. Besides providing a smooth outer surface to the filter 30, the skin 35 may be formed thicker than the thin walls 31 for strength. The exterior surface 35a of the skin 35 forms the longitudinal outer surface of the filter 30. According to the invention, the thin walls 31 and skin 35 each have interconnected open porosity of a size and volume sufficient to allow the fluid to flow completely across the thin walls between adjoining cells and across the skin 35 between the interior and exterior of the filter 30 (or vice versa) and, preferably, completely through the thin walls 31 and skin 35 in their longer dimensions and to prevent at least a significant portion of the solid particulates in the fluid from passing either completely across or completely through the thin walls 31 or skin 35 in any direction. The portion of particulates desired to be trapped will vary with the filtering application and may even be less than 50%. Filter efficiency may be controlled by a proper selection of open porosity and wall thickness. The skin 35 has been partially broken away near each of the end faces 32 and 33 to reveal some of the cells 34 along the periphery of the end faces 32 and 33. Plugs 36 or other suitable means are provided for blocking, covering, sealing or otherwise closing the peripherally located cells 34 near the inlet end face 32. FIG. 2 depicts the upstream facing inlet end face 32 and indicates by shading the plugs 36 formed in the cells at the periphery of that end face as well as in other selected cells 34 at that end face. Each of the cells 34 is preferably sealed at only one of its two ends; the pattern of plugged cells at the end face 33 is therefor the reverse of the plugging pattern at end face 32 depicted in FIG. 2. This is better seen in FIG. 3 which shows the filter body 30 longitudinally sectioned along the line 3—3 of FIG. 2 and the plugs 36 formed in one end of each of a column of cells 34. Those cells 34 closed (i.e. plugged) at the outlet end face 33 and open at the inlet end face 32 are referred to as "inlet" cells. Those cells 34 open at the outlet end face 33 and closed at the inlet end face 32 are "outlet" cells.

Referring now to FIGS. 1 and 3, a contaminated fluid, represented by the arrow 37 is introduced through the inlet pipe 26 and is passed through the filter 30. Filtered fluid, represented by the arrow 38, is transported away from the filter body 30 and can 20 by the fluid outlet pipe 27. The outer diameter of the filter 30 is less than the inner diameter of the filter holding sections 23 ans 23' of the can 20 forming a gap 39 between the inner surfaces 23a and 23a' of those sections and the exterior surfaces 35a of the skin 35. The contaminated fluid is introduced to the inlet end face 32 and a portion of the fluid represented by the arrows 37b enters the filter 30 through those interior cells 34 which are not plugged at the end face 32 (i.e. the "inlet cells"). A portion of contaminated fluid indicated by the arrows 37a also flows past the end face 32 and along the gap 39 between the skin 35 and filter holding sections 23 and 23' of the can 20. Sealing means 40 provided between the can 20 and filter 30 near its outlet end face 33 prevents the passage of the contaminated fluid past the filter body 30 and its mixture with the filtered fluid 38 being collected in the conical section 22 for removal through the outlet pipe 27. The sealing means or barrier 40 extends continuously around and between the inner surface 23a' of the filter holding section 23' and the exterior surface 35a of the filter skin 35. The barrier 40 is essentially impermeable to the solid particulates in the contaminated fluid to be removed by the filter 30 but may, if desired, be permeable to the fluid. The contaminated fluid 37a in the gap 39 enters the skin 35 and flows across its thickness through its interconnected open porosity into the peripherally located outlet cells, passing through those cells, as indicated by the arrows 38b, and from the filter 30. A portion of the fluid in the skin 35 may also exit the filter 30 through the skin 35 at the outlet end face 33, as is indicated by the arrows 38c or pass through the sealing means 40 if fluid permeable. Fluid 37b in the inlet cells passes through and across the porous, thin walls 31 exiting the filter through adjoining and/or neighboring outlet cells, as is partially represented by the arrows 38b, or exits the filter 30 through the portions of the porous thin walls 31 extending between the plugs 36 at the outlet end face 33, as is also represented by the arrows 38c. The filtered fluid 38 (i.e. 38b and 38c) passing out of the filter body 30 through the end fade 33 is collected by the conical conduit section 22 and channeled into the outlet pipe 27 for removal.

Preferably, the sealing means 40 contact the skin 35 of the filter 30 near one of the end faces 32 or 33. Where the cells 34 near the periphery or edge of the end faces 32 or 33 are all or substantially all closed near one end face, as is preferred, the sealing means 40 are preferably located near the remaining end face. In FIG. 1, the cells 34 located at the periphery of the end faces are sealed near the inlet end face 32 and the sealing means 40 has been located near the outlet end face 33 of the filter 30.

Figure 4:
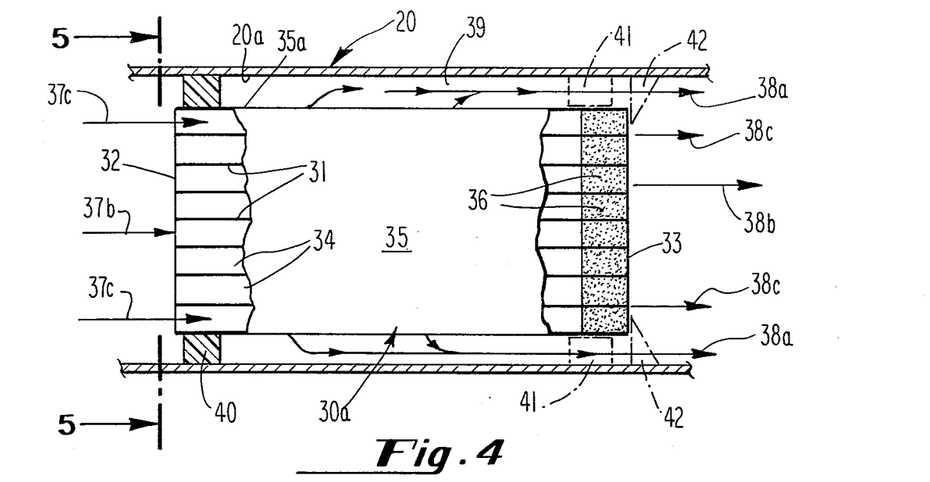
FIG. 4 is a diagrammatic view, similar to that of FIG. 1, of an alternate embodiment of the present invention depicting a longitudinally sectioned length of contained filter with partially broken away outer wall.
Figure 5:
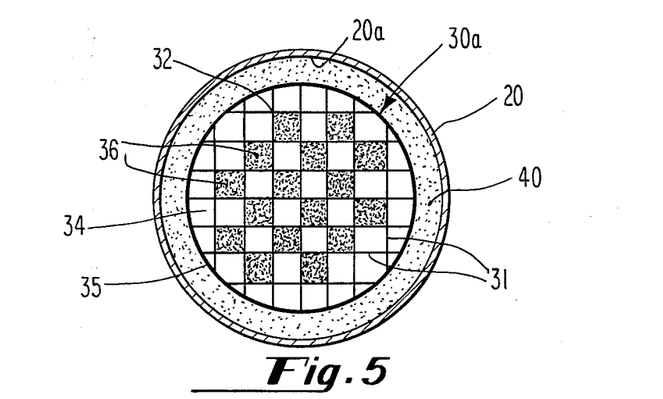
FIG. 5 is a cross-sectional view of the apparatus of FIG. 4 along the lines 5—5 depicting the inlet end face of this filter body embodiment.

FIGS. 4 and 5 depict in a more simplified diagrammatic view, an alternate configuration of the embodiment of the invention depicted in FIGS. 1-3 preferred to maximize fluid flow through the peripherally located cells and thereby reduce possible thermal gradients in the thin walls. Again, a can 20, a filter 30a and sealing means 40 between an inner surface 20a of the can and the exterior surface 35a of the filter skin 35 have been provided. The sealing means 40 are now located in the vicinity of the inlet end face 32 of the filter body 30a. The skin 35 of the filter 30a has again been partially broken away to reveal some of the cells 34 along the periphery of the end faces 32 and 33 which have now been blocked with plugs 36 or other suitable means at the opposite, outlet end face 33. FIG. 5 depicts the inlet end face 32 of the filter 30a of FIG. 4 and reveals the inlet cells (open at the depicted inlet end face 32 and closed at the outlet end face 33) located around the periphery of the end face 32 and interspersed with outlet cells closed with plugs 36 or other suitable means at the inlet end face 32 and open at the outlet end face 33. As is disclosed in the aforesaid application Ser. No. 350,995, more collective inlet cell than outlet cell thin wall surface area has been provided to improve the capacity and operating life of the filter by providing more inlet than outlet cells 34. Contaminated fluid flow and filtered fluid flow are indicated by arrows 37b and 38b, respectively. Contaminated fluid 37b is brought to the upstream, inlet end face 32 of the filter 30a and passes into the filter 30a through the inlet cells (i.e. those cells open at the inlet end face 32). A portion of the contaminated fluid 37b passes into the non-peripherally located inlet cells and flows across their thin porous walls 31 into adjoining outlet cells and through the longer dimensions of the walls 31 into adjoining or nearby outlet cells, exiting the filter body through the outlet cells (as is represented by the lined arrows 38b) or thin walls 31 at the outlet end face 33 (as indicated by arrows 38c). A portion of the contaminated fluid 37c enters the peripherally located inlet cells, passes across the porous skin 35 into the gap 39 between the exterior surfaces 35a of the skin 35 and the inner surface 20a of the can 20. This filtered fluid, represented by the lined arrows 38a, travels through the gap 39 and past the outlet end face 33. Some of the contaminated fluid 37c and 37b in the peripherally and non-peripherally located cells passes through the skin 35 and thin walls 31 along their longer dimensions and out the end face 33, as is represented by the lined arrows 38c. The filtered fluid 38 (i.e. 38a, 38b and 38c) is collected by the downstream portion of the can 20 and conducted away from the filter 30a.

The sealing means 40 may be sufficiently strong and rigid to center and immobilize the filter body 30 or 30a within the can 20. However, additional means such as the pylons 41 indicated in FIG. 1 may be provided between the outer wall 35 of the filter 30 and the inner surface of the filter holding sections 23 and 23' to laterally or laterally and longitudinally fix the filter 30 in the can 20. As can be better seen in FIG. 2, the pylons 41 occupy a very small portion of the annular gap 39 between the filter body 30 (or 30a) and filter holding sections 23 and 23' and do not substantially interfere with the flow of the contaminated fluid 37a (FIGS. 1–3 and 6) or filtered fluid 38a (FIGS. 4–5) along the exterior surface 35a of the skin 35. Alternatively or additionally, longitudinal movement of the filter 30 (or 30a) within the can 20 may be further limited by the provision of other suitable support means such as tabs 42 (depicted in phantom in FIG. 1) which protrude from the inner surface of the can 20 and contact the end face(s) 32 and/or 33, again without covering any significant number of cells.

Figure 6:
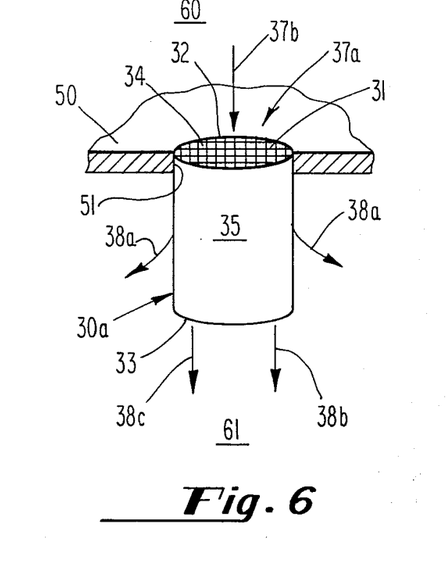
FIGS. 6 and 7 are diagrammatic views of other types of conduits with which the invention may be used.
Figure 7:
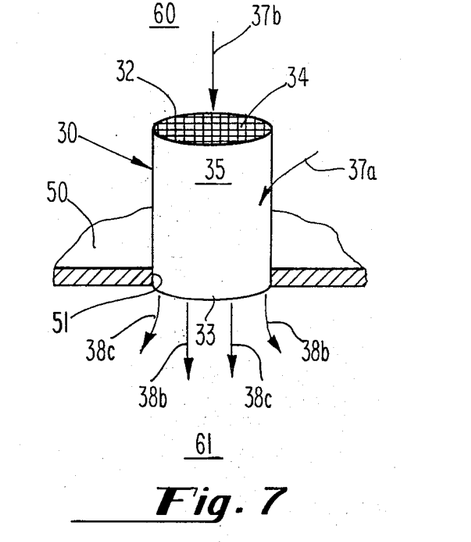
Figure 8:
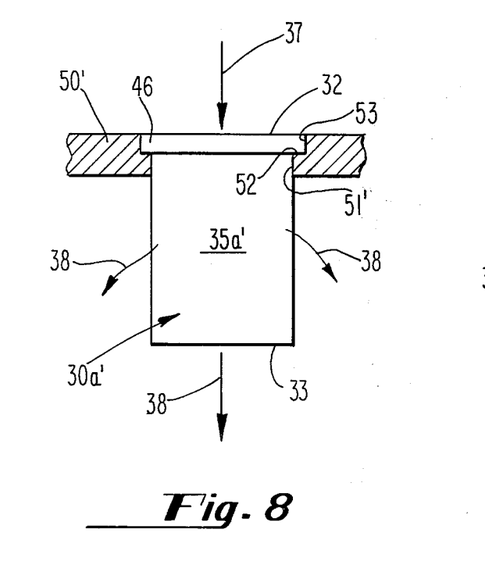
FIGS. 8 and 9 are diagrammatic views of yet other embodiments of the invention having particulate barriers formed by mutually contacting surfaces of a filter and conduit.

All the conduit means 20 depicted thus far in describing the invention have been tubular, extending substantially the length of the filter body 30 (30a or 30b) and surrounding it in close proximity. The term conduit means as used herein in referring to the invention is, however, of much broader scope. For example, as in FIGS. 6–7, the conduit means may comprise a first reservoir 60 for holding a contaminated fluid and a second reservoir 61 for collecting filtered fluid. The reservoirs are separated by a planar conduit means or wall 50 into which the filter 30 or 30a of FIGS. 1 through 3 and 4 through 5, respectively is inserted as, for example, is depicted in FIGS. 6 and 7, respectively. Each filter 30a and 30 is mounted within the opening 51 and with respect to planar conduit means 50 so that a significant portion of its skin 35 extends into the filtered fluid reservoir 61 (FIG. 6) or the contaminated fluid reservoir 60 (FIG. 7).

In FIG. 6, the contaminated fluid 37a and 37b enters the filter 30a only through the inlet end face 32. Again, all of the peripherally located cells are preferably sealed at the outlet end face 33 to form inlet cells and the remainder of the cells 34 are sealed at one of their two ends to form an arrangement of inlet and outlet cells. One such exemplary arrangement is depicted in FIG. 5 but there is virtually an infinite variety of plugging patterns which may be used. Others are depicted, for example, in U.S. Pat. No. 4,276,071 and in the aforesaid applications Ser. Nos. 350,998 and 350,994. The contaminated fluid is filtered by passing from the peripherally located inlet cells through the skin 35, as is represented by the lined arrows 38a, and across and through the thin walls 31 from the inlet to the outlet cells and through the outlet end face 33, which flow is represented by the lined arrow 38b. A portion of the filtered fluid may also pass from the filter 30i a at the outlet end face 33 through the porous skin 35 and/or thin walls 31, as is represented by the lined arrow 38c. In FIG. 7 contaminated fluid enters the filter body 30 at the inlet end face 32 through the inlet cells and through the porous skin 35, as is represented by the lined arrows 37b and 37a, respectively. Filtered fluid exits the filter body 20 at the end face 33 through peripherally located and other outlet cells, as is represented by the lined arrows 38b and through the thin walls 31 and/or skin 35, as is represented by the lined arrows 38c. Barrier means have been omitted from both FIGS. 6–7 for clarity.

Figure 9:
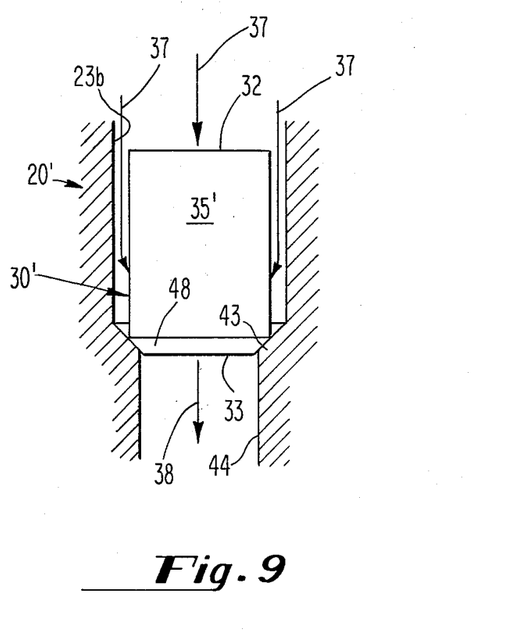

In addition to the separate and distinct sealing means 40 depicted in FIGS. 1 through 5, it is envisioned that the invention may be used by forming a seal between the inner surface of the encircling conduit means and the outer wall of a filter body. For example, a filter body may be provided with an integrally formed or attached protruding portion near one of its two end faces, such as the protruding portion 46 of larger diameter than that of the outer surface 35a' located near the inlet end face 32 of the filter body 30a' of FIG. 9 or the truncated conical surface 48 located near the outlet end face 33 of the filter body 30' in FIG. 10. As shown in FIG. 9, body 30a' is positioned within an opening extending through planar conduit means 50', which opening is defined by inner surfaces 51', 52 and 53. In the embodiment of FIG. 10, body 30' is positioned within tubular conduit means 20' having a bore defined by inner surfaces 23b, 43 and 44. The inner surfaces 52 and 53 are suitably contoured in stepped form to contactably mate with the protruding portion 46 (FIG. 9) and the inner surface 43 is suitably contoured in beveled form to contactably mate with the conical surface 48 (FIG. 10) to respectively form a seal therebetween which prevents contaminated fluid from flowing past either filter body 30a' or 30' and into the filtered fluid. A pressure differential can be maintained between the contaminated and filtered fluids in FIGS. 9 and 10 to keep the contoured portions 46 and 48 of the filters 30a' and 30' centered and pressed against the contoured surfaces 52,53 and 43 of the conduit means 50' and 20', respectively. Alternatively or additionally, the surfaces 46,48,52,53 and/or 43 may be coated with a film of suitable material to assure the formation of an adequate particulate barrier between the conduit and filter.

The described apparatus may be fabricated from any material(s) suitable (i.e. sufficiently durable, non-corrosive or chemically reactive, abrasive resistant, etc.) for the filtering operation to be undertaken. Typically, the conduit means may be fabricated from a conveniently formable or machinable material such as metal, plastic, etc.. Similarly, any of a variety of widely known materials and fabricating methods may be employed to provide suitable sealing between the conduit means 20 or 50 and outer surface 35 of the filter body 30. The sealing means 40 may be such as to immobilize the filter body 30 within the conduit means 20 and 50 or may be sufficiently pliable to allow some lateral and/or longitudinal movement of the filter body 30 with respect to the conduit means 20 and 50. In the latter case, additional support means such as the pylons 41 of FIGS. 1 through 2, are desirably provided so as to maintain the gap 39 between the exterior surface of the filter skin and the inner surfaces of the conduit means extending substantially along the length of the filter to assure adequate space for fluid flow through and along the outer longitudinal surface of the filter. The matrix of thin walls 31 and porous skin 35 of the filter may be formed from any of variety of materials including glasses, ceramics (typically crystalline), metallic powders, resins or organic polymers, papers, textile fabrics (with or without fillers), etc. and various combinations thereof, such as cermets and glass-ceramic mixtures, by a variety of methods depending upon the material(s) selected. Honeycomb structures having the porous skin 35 and the thin porous interconnected walls 31 necessary for practicing the invention are preferably fabricated from sinterable, finely divided particles and/or short length fibers of substances that yield a porous, sintered material after being fired to effect their sintering, especially metallic powders, ceramics, glass-ceramic, cermets, and other ceramic-based mixtures. The sinterable materials can be formed into honeycomb structures by methods such as layering, described in U.S. Pat. Nos. 3,112,184 and 3,444,925, a pipe binding process wherein a large number of sinterable material pipes are bound together with sinterable materials to form a honeycomb structure or, preferably, by extrusion of a plastically formable batch mixture of a sinterable material as is disclosed, for example, in U.S. Pat. Nos. 3,790,654, 3,919,358 and 4,008,033, and a pending commonly assigned application Ser. No. 260,343, filed May 4, 1981, now U.S. Pat. No. 4,364,888, all of which are incorporated by reference. The honeycomb structure thus formed is fired to effect its sintered condition as is disclosed, for example, in U.S. Pat. No. 3,899,326. As desired, any suitable or conventional fugitive or combustible (burn-out) additive (besides volatalizable plasticizers and binders used in the preparation of the formable mixture) can be dispersed within the formable and sinterable mixture so as to provide appropriate and adequate interconnected open porosity in the sintered material of the thin walls 31 and outer wall 35 of the filter body 30. Desirably, the thin walls 31 and outer wall 35 are formed monolithically by extrusion from the same batch material in a single step with the interconnected open porosity extending between the thin walls 31 and outer wall 35.

The ends of the cells 34 may also be closed by plugging, covering or any other suitable technique and with any suitable material. Preferably, plugs 36 are formed by charging flowable or plastically formable plugging material into selected cell ends at either or both end faces 32 and 33, in a manner as is disclosed in the aforesaid pending application Ser. No. 165,646 and in co-pending patent applications Ser. Nos. 283,732, 283,733, 283,734, and 283,735, filed July 15, 1981, and application Ser. Nos. 295,610 and 295,611 filed Aug. 8, 1981, all assigned to the assignee of this application and incorporated by reference. The referenced methods and apparatus may be utilized to plug green (i.e. dried but not sintered) or sintered honeycomb structures or other non-sinterable rigid honeycomb structures. The plugging material may then be allowed to dry, set or is sintered, etc. so as to form durable plugs 36 across the cell ends mechanically and/or chemically connected to the thin walls 31 forming the cells 34 and providing seals nonpermeable to the solid particulate material being filtered.

A preferred use of the invention is as a diesel exhaust gas particulate filtration system. The system comprises a tubular conduit means, or "can" 20, such as is depicted in FIG. 1, which surrounds and holds the filter for mounting in the engine exhaust system. The can 20 is similar to a conventional type employed for mounting catalytic converter honeycomb substrates in the exhaust systems of internal combustion engines, as is described in U.S. Pat. No. 3,441,381, incorporated by reference, and can be fabricated in the manner described in that patent. Each filter body 30, 30a or 30b is preferably formed from an extruded, sintered ceramic honeycomb monolithic substrate which has been plugged with plastically formable and sintered ceramic materials. Extruded, ceramic honeycomb structures having cordierite as its primary crystal phase, which is preferred for diesel exhaust particulate filtration and other moderately high temperature solid particulate filtering applications (approximately 1,000° C. or more) due to its low thermal expansion characteristics, may be provided in the manner described in the aforementioned application Ser. No. 165,646. Plugs 36 are formed from a material which has, in addition to the previously recited characteristics of durability, chemical inertness and/or non-reactivity, etc., a coefficient of thermal expansion which closely follows (i.e. within about 10 parts per million) that of the honeycomb structure over the range of temperatures to which the plugs 36 and honeycomb structure are exposed. Plugs 36 may be formed from foam-type ceramic cements which sinter and react into a primarily cordierite crystal phase and which are thermally compatible with the aforesaid cordierite ceramic structures. These cements are described and claimed in a copending commonly assigned application Ser. No. 165,647 filed July, 3, 1980, now U.S. Pat. No. 4,297,140 and which is incorporated by reference herein. A particular manganese-magnesium composition of that foam-type cordierite cement, which is preferred for use with diesel exhaust particulate filtering and other filtering applications having significant sodium ionic concentrations, is described in the aforesaid application Ser. No. 165,646. As is described in the application Ser. Nos. 165,646 and 165,647, the foam-type cordierite cement is used by charging a plastically formable batch of the cement into a previously sintered honeycomb structure and firing the structure and plugs to a temperature of about 1200° C. to foam and sinter the cement forming rigid plugs in the cell ends. Alternatively, a plugging material having a slight relative dimensional expansion with respect to a green, sinterable honeycomb structure after the plugging material and structure have been heated to a temperature at which the structure is substantially sintered may be used, as is described and claimed in another copending application Ser. No. 295,612 filed Aug. 8, 1981, assigned to the assignee of this application and incorporated by reference herein. Exemplary compatible honeycomb structure and plugging material batch mixture compositions, which react to form primarily cordierite crystal phases when sintered and which may be used for diesel exhaust gas filtration, are described in that application.

For diesel particulates filtering applications, the thin walls 31 formed in thicknesses of less than about 1.5 mm. (about 0.060 in.) to minimize filter volume and preferably between about 0.25 and 0.76 mm. (about 0.10 and 0.030 in.). The outer wall 35 may lie within the same range of thicknesses although a greater thickness may be desired for the outer wall 35 than for the thin walls 31 to strengthen the resulting filter. Open porosity of the thin wall 31 and outer wall 35 is formed by pores having mean diameters of between about 1 and 60 microns desirably at least about 3.5 microns or more and preferably between about 10 and 50 microns. The volumetric open porosity of the thin walls 31 and outer wall 35 should also be greater than about 25% of the wall bulk volume and is preferably at least about 40% or more to foster fluid flow through the longer wall dimensions. Volumetric open porosities greater than about 70% may result in walls to weak to withstand diesel exhaust operating conditions. Useful transverse cross-sectional cellular densities are between about 10 and 300 cells/in.$^2$ (about 1.5 and 46.5 cells/cm.$^2$) and preferably between about 100 and 200 cells/in.$^2$ (about 15.5 and 31 cells/cm.$^2$).

Either of two types of sealing means may be desirably employed between the inner surface of the can 20 and outer surface of the honeycomb filter body 30. The first is a pliable, fibrous, ceramic-based material manufactured and supplied by the 3-M Corporation under the name Matt-mount TM which expands with temperature upon first being heated to provide a constant pressure against the outer wall 35 of the filter. The material may be installed by wrapping a narrow strip around the skin 35 of the filter 30 and fitting the wrapped filter 30 into an appropriate filter holding section 23 and 23' of a can 20. The material may also be used to form the pylon support means 41 previously described. The structural integrity of the material is maintained up to a temperature of about 1200° C. An alternative material is a heat resistant, fluorocarbon polymer coated, densely woven stainless steel mesh cord covered with a fiberglass sleeve. Supplied under the brand name Novatem TM by R & M Industries, the material is widely used for the mounting of automotive catalytic converters and is presently supplied in bulk rolls of cord having a diameter ranging between 0.245 and 0.330 inches (about 6 and 8 mm.). The cord is cut to length and jam fitted, either butted end to end or overlapped, to form an annular seal between the outer longitudinal wall 35 of the filter 30 (30a or 30b) and inner surface 20a of the can 20. Positioning tabs 42 may also be provided, if desired, by welding appropriately formed steel members to the inner surface of the can 20.

While various embodiments of the invention and suggested modifications thereto have been described, it should be understood that other modifications could be made in the structure and arrangement of the described embodiments without departing from the scope of the invention which is more fully defined in the following claims.

What is claimed is:

1. An apparatus for filtering solid particulates from a fluid comprising:
   a filter of honeycomb structure comprising:
     a matrix of interconnected thin porous walls defining an inlet end face and an outlet end face and a multiplicity of cells extending longitudinally between the two end faces, and
     a porous outer wall extending between the two end faces and around the matrix of thin walls and having an exterior surface forming an outer longitudinal surface of the filter,
     an inlet group of the cells each being open at the inlet end face and closed at the outlet end face,
     an outlet group of the cells each being closed at the inlet end face and open at the outlet end face, and
     the thin walls and the outer wall each containing interconnected open porosity of volume and size sufficient to enable the fluid to flow completely across the narrow dimensions of the walls and the outer wall and to restrain at least a significant portion of the particulates from flowing completely across the thin walls or the outer wall;
   conduit means having an inner surface encircling the outer wall of the filter for transporting fluid containing the particulates to the filter and filtered away from the filter, the inner surface being spaced from the outer wall to form an annual gap therebetween;
   sealing means in the gap between the conduit means inner surface and the filter outer wall encircling the filter at a position remote from said outlet end face and forming a particulate barrier for preventing the particulates from bypassing the filter through the gap between the conduit means inner surface and the filter outer wall, the barrier being sufficiently narrow at the filter to allow the fluid to pass outwardly through and along a substantial portion of the exterior surface of the outer wall to the perimeter of outlet end face.

2. The apparatus of claim 1 wherein the particulate barrier contacts the outer surface in the vicinity of the inlet end face.

3. The apparatus of claim 2 wherein substantially all of the cells around the periphery of the end faces are open at the inlet end face and closed at the outlet end face.

4. The apparatus of claim 1 wherein the particulate barrier is essentially impermeable to said fluid.

5. The apparatus of claim 1 wherein the interconnected open porosity of the thin walls and skin is also of a volume and size to enable the fluid to flow through the thin walls and outer surface in their longer dimensions while restraining at least a significant portion of the particulates from passing completely through the thin walls or outer wall along any wall dimension.

6. The apparatus of claim 1 further comprising means for restricting the movement of said filter body with respect to said conduit means.

7. The apparatus of claim 1 wherein said filter is formed from ceramic materials.

8. In a deisel engine exhaust system comprising and exhaust gas conduit, said exhaust gas conduit including the apparatus of claim 7 wherein said conduit means is a portion of the exhaust gas conduit containing the filter interposed across the exhaust gas path through the conduit with the inlet end face of the filter facing an upstream portion of the gas path, and the cells located around the periphery of the end faces being closed near the outlet end face of the filter.

9. The apparatus of claim 1 wherein the open porosity of the outer wall is at least 25% of the outer wall bulk volume and is formed by pores having mean diameters greater than about 1 micron.

10. The apparatus of claim 9 wherein the open porosity of the outer wall and thin walls is about 40% or more of the bulk wall volume.

11. The apparatus of claim 10 wherein the thickness of the outer wall and the thickness of each thin wall is not greater than about 0.76 mm.

12. The apparatus of claim 1 wherein said sealing means is in contact with said conduct means inner surface and said filter outer wall.

13. In a method of filtering solid particulates from a fluid comprising the steps of providing a filter body of honeycomb structure having a matrix of interconnected porous thin walls defining an inlet end face and an outlet end face and a plurality of cells extending through the structure between the two end faces, and a porous outer wall surrounding the thin walls and extending between the end faces, the thin walls and outer surfaces containing interconnected open porosity of a volume and size sufficient to enable the fluid to flow completely across or through the walls and outer surface along any of their dimensions and to restrain at least a significant portion of the particulates from passing completely across or through the thin walls or outer wall in any direction, an inlet group of the cells being open at the inlet end face and closed adjacent to the outlet end face and an outlet group of the cells being closed adjacent to the inlet end face and open at the outlet end face; wherein said method comprises conducting a fluid contaminated with solid particulates into the inlet end face of the filter body; filtering the solid particulates from the fluid by means of the thin walls; and conducting a filtered fluid away from the outlet end face of the filter body, the improvement comprising during the filtering step, the additional step of filtering the fluid outwardly through a substantial portion of the outer wall of the filter body.

* * * * *